US012382346B2

(12) United States Patent
Polaganga et al.

(10) Patent No.: US 12,382,346 B2
(45) Date of Patent: Aug. 5, 2025

(54) DYNAMIC STEERING ACROSS NON-STANDALONE AND STANDALONE NETWORK ARCHITECTURES BASED ON UPLINK THROUGHPUT REQUIREMENTS

(71) Applicant: T-MOBILE INNOVATIONS LLC, Overland Park, KS (US)

(72) Inventors: Roopesh Kumar Polaganga, Bothell, WA (US); Amembal Vikram Pai, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 420 days.

(21) Appl. No.: 18/098,477

(22) Filed: Jan. 18, 2023

(65) Prior Publication Data

US 2024/0244487 A1 Jul. 18, 2024

(51) Int. Cl.
*H04W 28/24* (2009.01)
*H04W 28/08* (2023.01)
*H04W 36/00* (2009.01)
*H04W 36/30* (2009.01)

(52) U.S. Cl.
CPC ....... *H04W 28/24* (2013.01); *H04W 28/0858* (2020.05); *H04W 36/0005* (2013.01); *H04W 36/00222* (2023.05); *H04W 36/00224* (2023.05); *H04W 36/30* (2013.01)

(58) Field of Classification Search
CPC ......... H04W 36/0005; H04W 36/0022; H04W 36/00222; H04W 36/0033; H04W 36/00224; H04W 36/00226; H04W 28/24; H04W 28/0858; H04W 36/30; H04W 28/0236; H04W 28/0268
See application file for complete search history.

(56) References Cited

U.S. PATENT DOCUMENTS

| 12,267,737 | B2 * | 4/2025 | Pakniat | H04W 36/0061 |
| 2022/0345955 | A1 * | 10/2022 | Lin | H04W 36/144 |
| 2025/0039856 | A1 * | 1/2025 | Chin | H04W 36/0088 |
| 2025/0113280 | A1 * | 4/2025 | Shieh | H04W 36/36 |

OTHER PUBLICATIONS

Polese et al, "Improved Handover Through Dual Connectivity in 5G mmWave Mobile Networks", IEEE (Year: 2017).*
Elnashar, et al, "Performance Evaluation of VoLTE Based on Field Measurement Data", IEEE, (Year: 2018).*
Abu-Ali et al, "Uplink Scheduling in LTE and LTE-Advanced: Tutorial, Survey and Evaluation Framework", IEEE (Year: 2014).*

\* cited by examiner

*Primary Examiner* — Omer S Mian
(74) *Attorney, Agent, or Firm* — Shook, Hardy & Bacon L.L.P.

(57) ABSTRACT

Aspects of the present disclosure a method for dynamic steering across non-standalone and standalone network architectures based on uplink throughput requirements is provided. The method begins with determining if at least one UE is active on an SA layer. A determination is then made whether the UE has only non-guaranteed bit rate data bearers with no voice and delay sensitive bearers. The uplink buffer threshold for the at least one UE is then compared with an operator defined uplink buffer threshold. Next, a comparison is made with an uplink throughput estimate on the SA and an uplink throughput estimate for the at least one UE on an NSA layer is made. If the NSA layer has a higher uplink throughput estimate than the SA layer, a dynamic handover is performed from the SA layer to the NSA layer.

14 Claims, 7 Drawing Sheets

DYNAMIC STEERING ACROSS NON-STANDALONE AND STANDALONE NETWORK ARCHITECTURES BASED ON UPLINK THROUGHPUT REQUIREMENTS

BACKGROUND

The growth of 5G wireless communications has brought more users to 5G networks and gives users faster, more reliable, and more capable telecommunications services. 5G networks provide for deployment in non-standalone (NSA) mode and standalone (SA) mode. In NSA, a master eNB (MeNB) acts as an anchor for signaling and data while a secondary gNB (SgNB) may be added as needed to handle data in both uplink and downlink directions. Uplink packet data convergence protocol (UL PDCP) aggregation may increase uplink throughput by aggregating long-term evolution (LTE) and new radio (NR). SA does not depend on a LTE evolved packet core (EPC) to operate. Instead, it pairs 5G radios with a native cloud 5G core network. NSA offers better uplink speeds while SA is the preferred future use. In some instances user equipment (UE) may be attempting uplink data operations on NSA and experiencing poor throughput, while an SA mode that may not need additional aggregations could be used. Uplink throughput requirements are not currently considered when layer steering is performed, resulting in poor data speeds and unsatisfactory user experience.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for dynamic steering across NSA and SA network architectures based on uplink throughput requirements are provided. A UE is active on an SA layer of a network. The UE may send to the primary cell information on the type of call that is active. The UE may be conducting a data call or may be on a voice call. The primary cell determines if the UE is conducting a call using non-guaranteed bit rate data bearers and is not using voice or delay sensitive bearers. Bearers are the tunnels used to connect the UE to the packet data network. If the UE has only non-guaranteed bit rate data bearers, is not using voice, and is not using delay sensitive bearers, the UE may be a candidate for dynamic steering from the SA layer to the NSA layer.

The primary cell then proceeds to determine if the uplink buffer threshold for the UE is higher than a network operator defined threshold. If the UE's uplink buffer threshold is higher than the network operator defined threshold, an uplink throughput estimate for the UE on the SA layer is performed. The uplink throughput estimate on the SA layer is then compared with the uplink throughput estimate for the UE on an NSA layer. If the uplink throughput estimate is higher on the NSA layer, the UE is instructed to handover from the SA layer to the NSA layer. Once the handover is complete, the UE continues the call on the secondary cell on the NSA layer.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
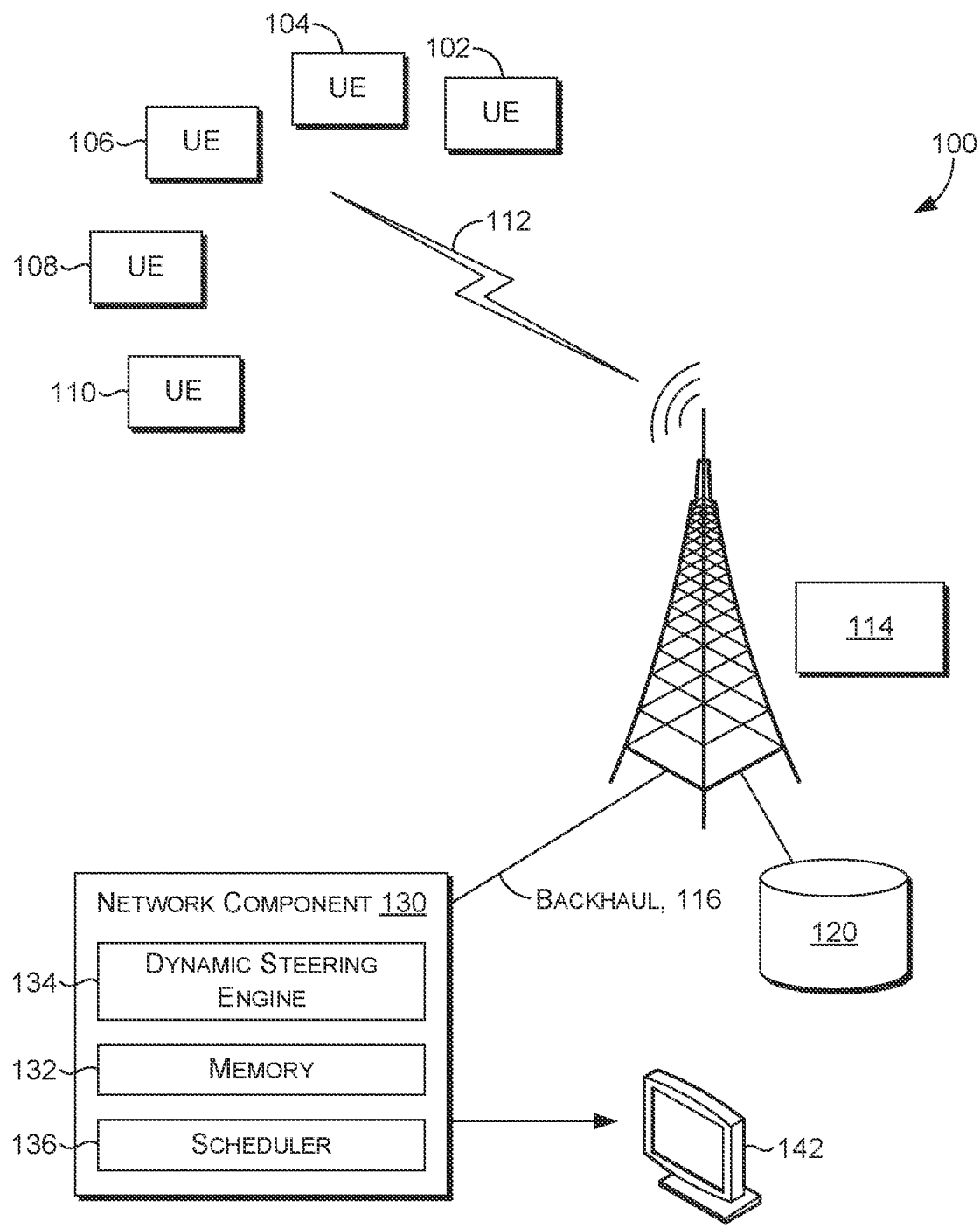
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| 6G | Sixth-Generation Cellular Communication System |
| AI | Artificial Intelligence |
| CD-ROM | Compact Disk Read Only Memory |
| CDMA | Code Division Multiple Access |

| | |
|---|---|
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIMO | Multiple Input Multiple Output |
| MD | Mobile Device |
| ML | Machine Learning |
| PC | Personal Computer |
| PCS | Personal Communications Service |
| PDA | Personal Digital Assistant |
| PDSCH | Physical Downlink Shared Channel |
| PHICH | Physical Hybrid ARQ Indicator Channel |
| PUCCH | Physical Uplink Control Channel |
| PUSCH | Physical Uplink Shared Channel |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Transmission Receive Power |
| RSRQ | Reference Transmission Receive Quality |
| RSSI | Received Transmission Strength Indicator |
| SINR | Transmission-to-Interference-Plus-Noise Ratio |
| SNR | Transmission-to-noise ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications Systems |
| WCD | Wireless Communication Device (interchangeable with UE) |

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. A base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 800 described herein with respect to FIG. 8.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method for dynamic steering across non-standalone and standalone network architectures based on uplink throughput requirements is provided. The method begins with determining if at least one UE is active on an SA layer. If there is at least one UE active on the SA layer, a determination is made whether the UE has only non-guaranteed bit rate data bearers with no voice and delay sensitive bearers. If there are no delay sensitive bearers, or voice, and only non-guaranteed bit rate data bearers, then the uplink buffer threshold for the at least one UE is compared with an operator defined uplink buffer threshold. If the uplink buffer threshold of the at least one UE is higher than the operator defined buffer threshold, a comparison is made with an uplink throughput estimate on the SA and an uplink throughput estimate for the at least one UE on an NSA layer is made. If the NSA layer has a higher uplink throughput estimate than the SA layer, a dynamic handover is performed from the SA layer to the NSA layer.

A second aspect of the present disclosure provides a method for dynamic steering across non-standalone and standalone network architectures based on uplink throughput requirements. The method begins with a UE transmitting an uplink message to at least one base station in an SA layer in the network. The uplink message may include information on a type of data bearers used by the UE. The UE may then receive a dynamic handover instruction from the at least one base station based on an uplink buffer threshold requirement.

Another aspect of the present disclosure is directed to a non-transitory computer storage media storing computer-useable instructions that, when used by one or more processors, cause the processors to determine if at least one UE is active on an SA layer. If at least one UE is active on the SA layer the processors may then determine if the at least one UE has only non-guaranteed bit rate data bearers with no voice and delay sensitive bearers. An uplink buffer threshold required may be determined for the at least one UE if there are only non-guaranteed bit rate data bearers with no voice and delay sensitive bearers. The uplink buffer threshold of the UE may then be compared with an operator defined buffer threshold. If the uplink buffer threshold requirement for the at least one UE is higher than the operator defined buffer threshold, an uplink throughput estimate for the SA layer is compared with an uplink throughput estimate for the NSA layer. If the NSA layer uplink throughput is higher than the SA layer uplink throughput, the processors instruct the at least one UE to dynamically handover from the SA layer to the NSA layer.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user equipment (UE) devices 102, 104, 106, 108, and 110, base station 114 (which may be a cell site or the like), and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, an extended reality device, and any combination of these delineated devices, an autonomous vehicle or drone, or any other device (such as the computing device 800) that communicates via wireless communications with the base station 114 in order to interact with a public or private network.

Figure 8:
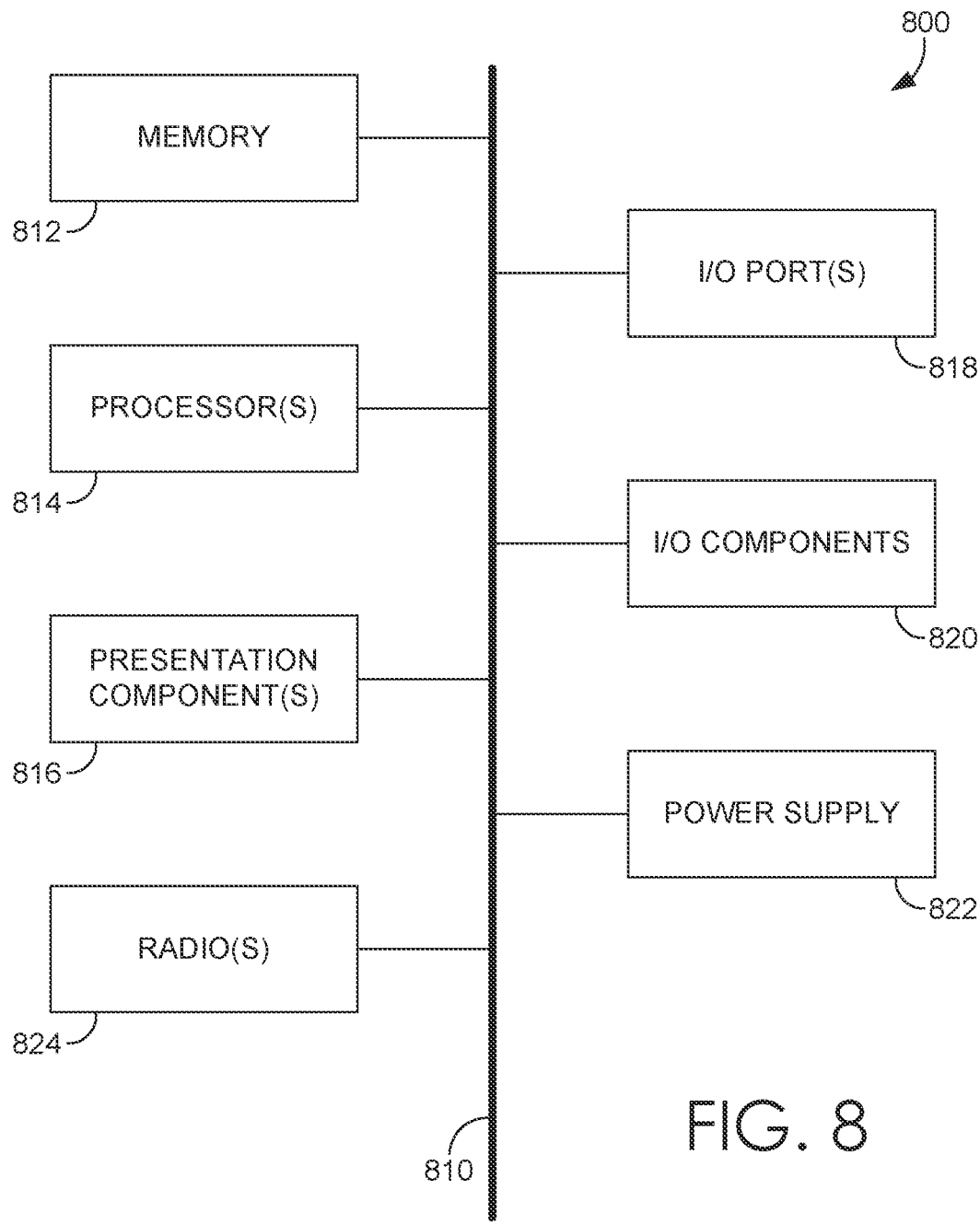
FIG. 8 depicts an exemplary computing device suitable for use in implementations of the present disclosure, in accordance with aspects herein.

In some aspects, each of the UEs 102, 104, 106, 108, and 110 may correspond to computing device 800 in FIG. 8. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, 6G, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Status data may include location data of a UE, such as UEs 102, 104, 106, 108, and 110 and may also include data usage and throughput. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. The status data may include location data and routing data for autonomous vehicles and may be updated more frequently for safety. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, a dynamic steering engine 134, and a scheduler 136. All determinations, calculations, and data further generated by the dynamic steering engine 134, and scheduler 136 may be stored at the memory 132 and also at the data store 142. Although the network component 130 is shown as a single component comprising the memory 132, dynamic steering engine 134, and the scheduler 136, it is also contemplated that each of the memory 132, dynamic steering engine 134, and scheduler 136 may reside at different locations, be its own separate entity, and the like, within the home network carrier system.

The network component 130 is configured to retrieve signal information, UE device information, slot configuration, latency information, including quality of service (QOS) information, and metrics, including data usage and throughput from the base station 114 or one of the UE devices 102, 104, 106, 108, and 110. UE device information can include a device identifier and data usage information. The scheduler 136 can monitor the activity of the UE devices 102, 104, 106, 108, and 110, and in conjunction with the dynamic steering engine 134 direct a radio access technology (RAT) change for a UE device, including any of UEs 102, 104, 106, 108, and 110, to move from a SA network to a NSA network.

Figure 2:
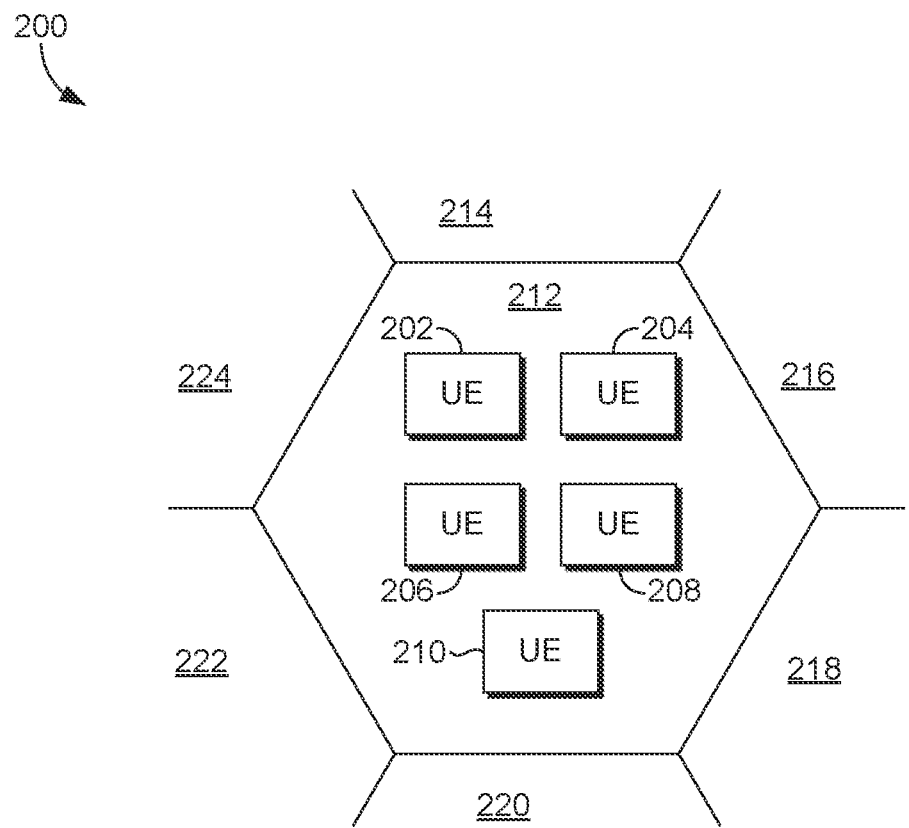
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell 212 and can move to other cells such as adjoining cells 214, 216, 218, 220, 222 and 224.

In NSA operation the MeNB acts as an anchor for signaling and data while a SgNB may be added as needed to support data use in both uplink and downlink directions. The MeNB may be an LTE cell and the NR gNB may be the secondary cell. Increased uplink data use may be driven by use cases such as virtual reality and augmented reality which use guaranteed bit rate (GBR) data streams to ensure acceptable user experience. UL PDCP aggregation may be used to increase uplink throughput by aggregating both LTE and NR usage. The PDCP is part of the LTE layer 2 protocols, which are responsible for the UP header compression of user-plane data packets. This compression reduces the number of information bits transmitted over the air interface and also improves transmission efficiency. The PDCP layer of the 5G NR protocol stack sits on top of the radio link control (RLC) control layer and below the service data adaption protocol (SDAP), the top-most layer of the 5G protocol stack in SA architecture. In NSA the gNB is the data split anchor.

SA architecture is where a gNB serves a UE, such as 202, 204, 206, 208, and 210, with no additional aggregation. In SA architecture the NR protocol stack connects the gNB to the 5G core network. During SA operation a specific QoS flow within a packet data unit (PDU) session is mapped to a corresponding data radio bearer (DRB). In addition, the transmitted packets are marked with the correct QoS flow identifier (QFI) to ensure correct forwarding through the 5G network. SA operation may use 80 MHz contiguous frequency or higher when deployed.

Any of the cells in FIG. 2, including 212, 214, 216, 218, 220, 222, and 224 may serve as an MeNB or a SgNB, depending on how the network operator has implemented 5G. Some cells may be upgraded with additional 5G features, while others may still need upgrades. As a UE, such as 202, 204, 206, 208, and 210 moves through the network varying levels of 5G service may be available and the UE may be handed off from SA service to NSA service as needed to support the UE's data requirements.

Figure 3:
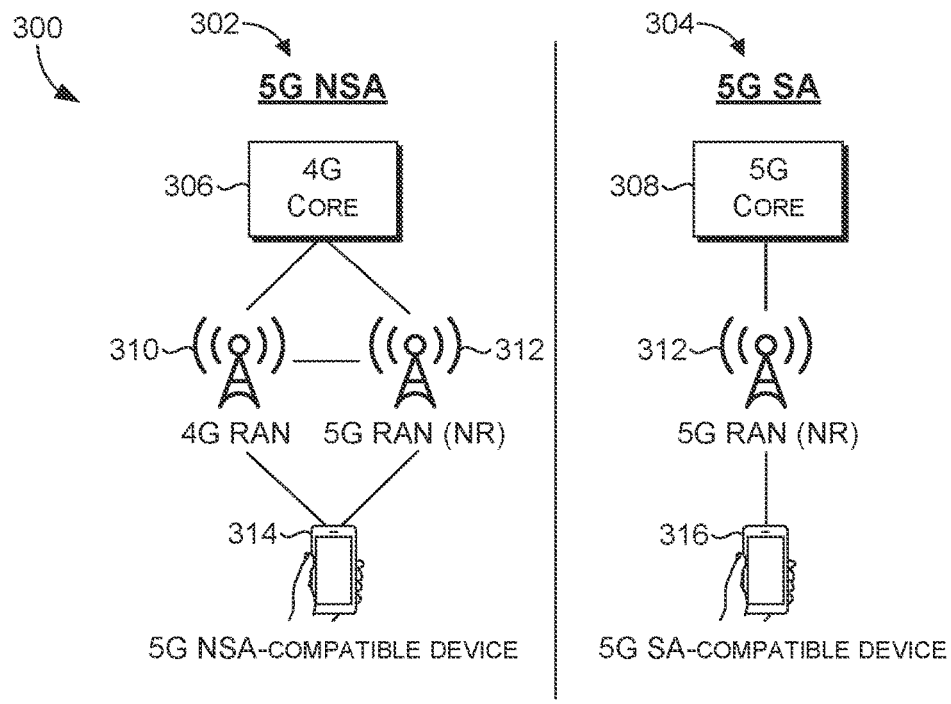
FIG. 3 depicts 5G NSA and 5G SA network architectures, in which implementations of the present disclosure may be employed, in accordance with aspects herein.

FIG. 3 depicts 5G NSA and 5G SA network architectures, in which implementations of the present disclosure may be employed, in accordance with aspects herein. A network 300 may include a 5G NSA architecture 302 and a 5G SA architecture 304. The 5G NSA architecture 302 includes a 4G core 306. The 4G core 306 is in communication with a 4G radio access network (RAN) base station 310 and a 5G RAN NR base station 312. Both the 4G RAN base station 310 and the 5G RAN NR base station 312 may be in communication with UE 314. In the 5G NSA architecture 302 the 5G RAN NR 312 may be the secondary gNB and the 4G RAN base station 310 may be the MeNB. In a 5G SA network architecture 304, a 5G core 308 is in communication with a 5G RAN NR base station 312 that communicates directly with the UE 314 and there is no secondary gNB.

Figure 4:
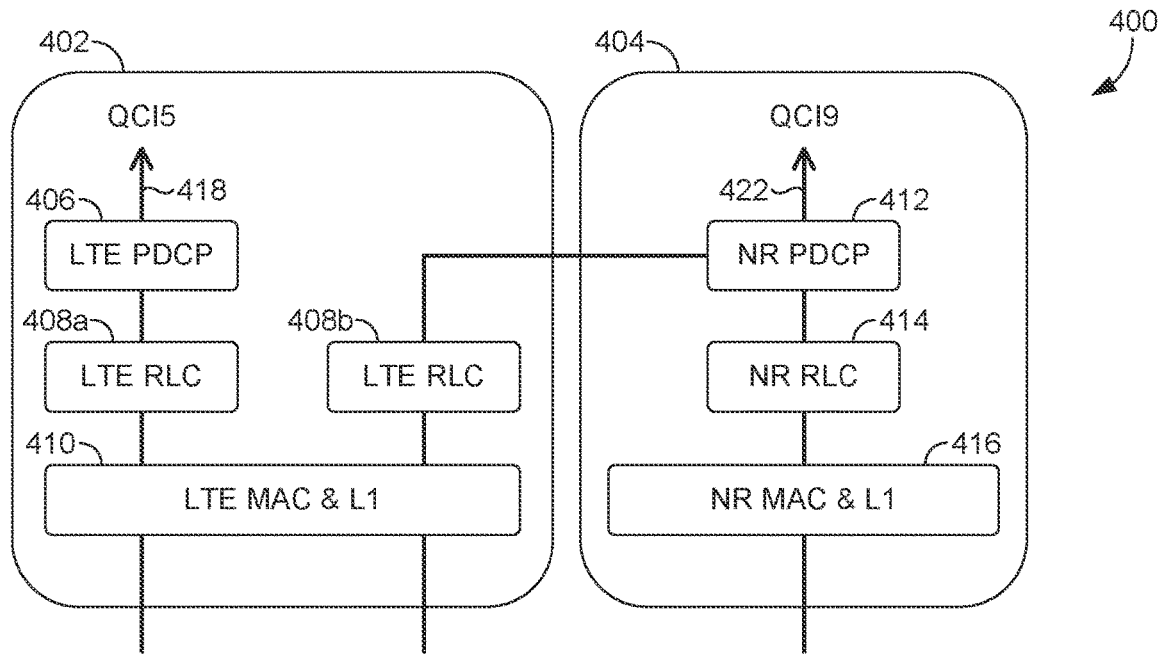
FIG. 4 is a block diagram of UL PDCP aggregation for use in 5G NSA to improve uplink data throughput, in accordance with aspects herein.

FIG. 4 is a block diagram of UL PDCP aggregation for use in 5G NSA to improve uplink data throughput, in accordance with aspects herein. The UL PDCP aggregation architecture 400 includes a LTE segment 402 and a NR segment 404. The LTE segment 402 has a LTE PDCP layer 406 that communicates with an LTE RLC layer 408a that in turn communicates with LTE MAC and L1 layer 410. A first data flow QCI 5 418 is processed through the LTE MAC and L1 layer 410, LTE RLC layer 408a and the LTE PDCP layer 406 before being transmitted to a UE.

The LTE segment 402 also handles a second data flow 422 with is passed through LTE MAC and L1 layer 410 and LTE RLC layer 408 before being handed to the NR segment 404. The NR segment 404 processes a third data flow 422 which passes through the NR MAC and L1 layer 416 and then through the NR RLC layer 414. After processing through the NR RLC layer 414 the third data flow 422 is passed to NR PDCP layer 412 where it is aggregated with second data flow 420 from the LTE segment 402. The aggregated second data flow 420 and third data flow 422 may be a non-GBR service flow.

The aggregation between the LTE segment 402 and the NR segment 404 may occur when it may be necessary to trigger a radio access technology (RAT) change for an individual UE based on uplink throughput requirements. If a UE is active on NR segment 404 and is using only non-guaranteed bit rate (non-GBR) data bearers with no voice or other delay sensitive bearers than an uplink buffer threshold requirement may be compared with a network operator defined threshold. The comparison may be made using an uplink throughput estimate having both LTE segment 402 and NR segment 404. This comparison may be based on available bandwidth and load. If the LTE estimate is higher than the NR segment estimate a handover from NR to LTE may be instructed. In this situation, the UE is instructed to complete a handover from SA to LTE.

Figure 5:
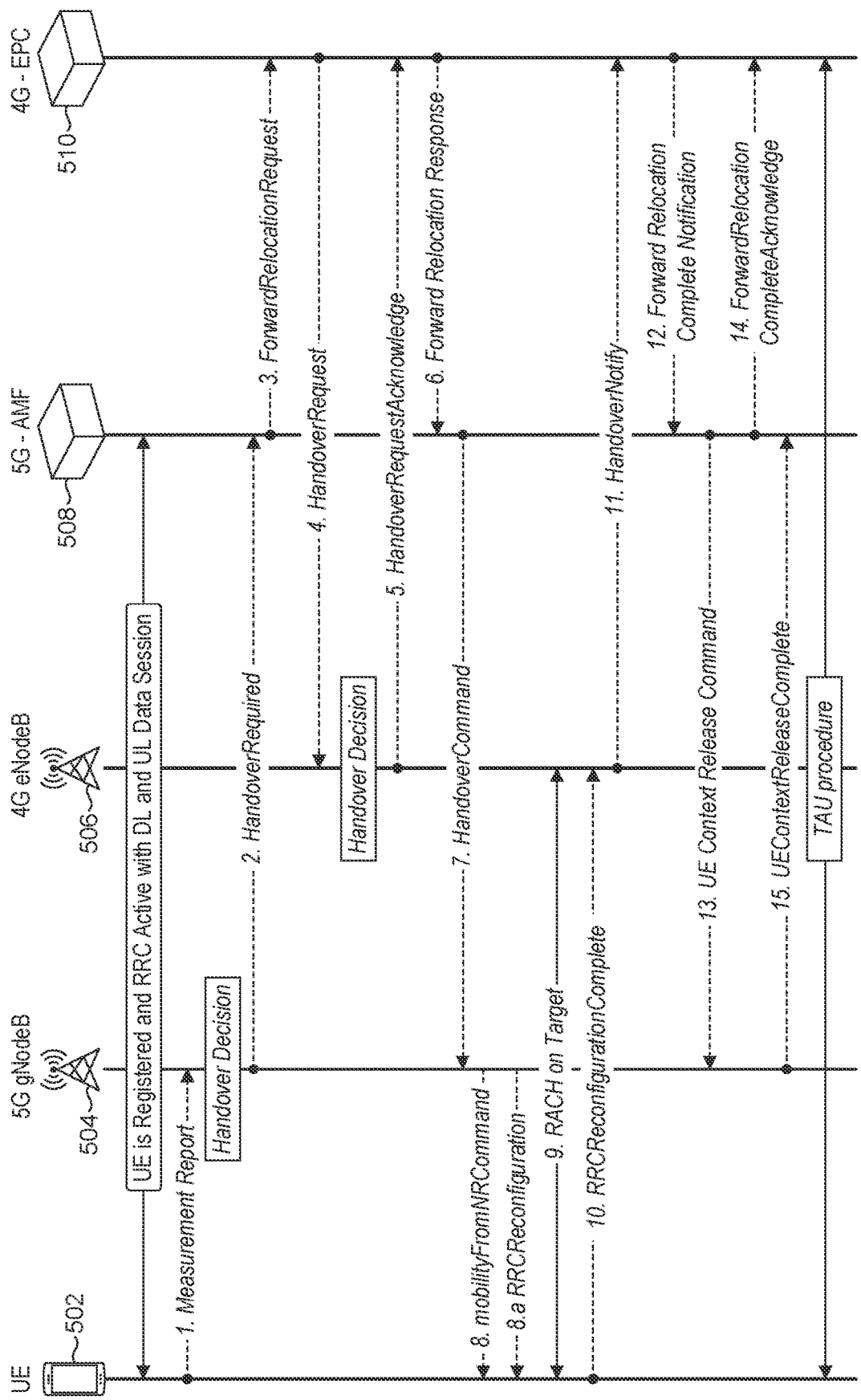
FIG. 5 depicts a call flow for a handover from an SA network to a NSA network, in accordance with aspects herein.

FIG. 5 depicts a call flow for a handover from an SA network to an NSA network, in accordance with aspects herein. The call flow 500 illustrates the operations between the UE 502, 5G gNB 504, 4G eNB 506, 5G access and mobility function (AMF) 508, and 4G evolved packet core (EPC) 510. The EPC 510 provides a framework for giving data and converged voice on a 4G network. At the start of the call flow UE 502 is registered and radio resource (RRC) active with an ongoing uplink and downlink data session. In step 1, UE 504 sends a measurement report to the 5G gNB 504. The measurement report may include a signal strength or signal quality report, such as SINR, RSRP, or similar measurement. The measurement report may also include an uplink throughput threshold, an uplink buffer threshold, or similar data threshold. In step 2, the 5G gNB 504 may determine, based on the measurement report and a network operator defined threshold for an uplink buffer. If the uplink buffer threshold requirement of UE 502 is higher than the network operator defined threshold the UE 502 will be issued a handover decision. The 5G gNB 504 informs the AMF 508 of the handover decision. The AMF 508 forward the relocation request to the EPC 510 in step 3. The EPC 510 then informs the 4G eNB 506 of the handover admission in step 4.

The 4G eNB 506 acknowledges the handover admission in step 5 by sending a handover acknowledgement to the EPC 510. In step 6 the EPC 510 responds by sending a relocation response to the AMF 508. Then, in step 7, the AMF 508 issues a handover command to the 5G gNB 504. The 5G gNB 504 then issues the mobility NR command to perform the handover. In step 8a the UE 502 performs an RRC reconfiguration. In step 9 the UE 502 sends a random access channel (RACH) uplink transmission to initiate synchronization with 4G eNB 506. The UE 502 responds in step 10 to the 4G eNB 506 with an RRC reconfiguration complete message. The 4G eNB 506 informs that EPC 510 in step 11 of the handover. The EPC 510 responds in step 12 with a forward relocation complete notification to the AMF 508.

In step 13 the AMF 508 sends a UE context release command to the 5G gNB 504 to release UE 502. In step 14, the AMF 508 sends a forward relocation complete notification to the EPC 510. In step 15, the 5G gNB 504 sends a UE context release complete message to the AMF 508. At the completion of step 15 the tracking area update may be performed when the UE 502 detects a new tracking area identity broadcast on the serving cell, here the added 4G eNB 506.

Figure 6:
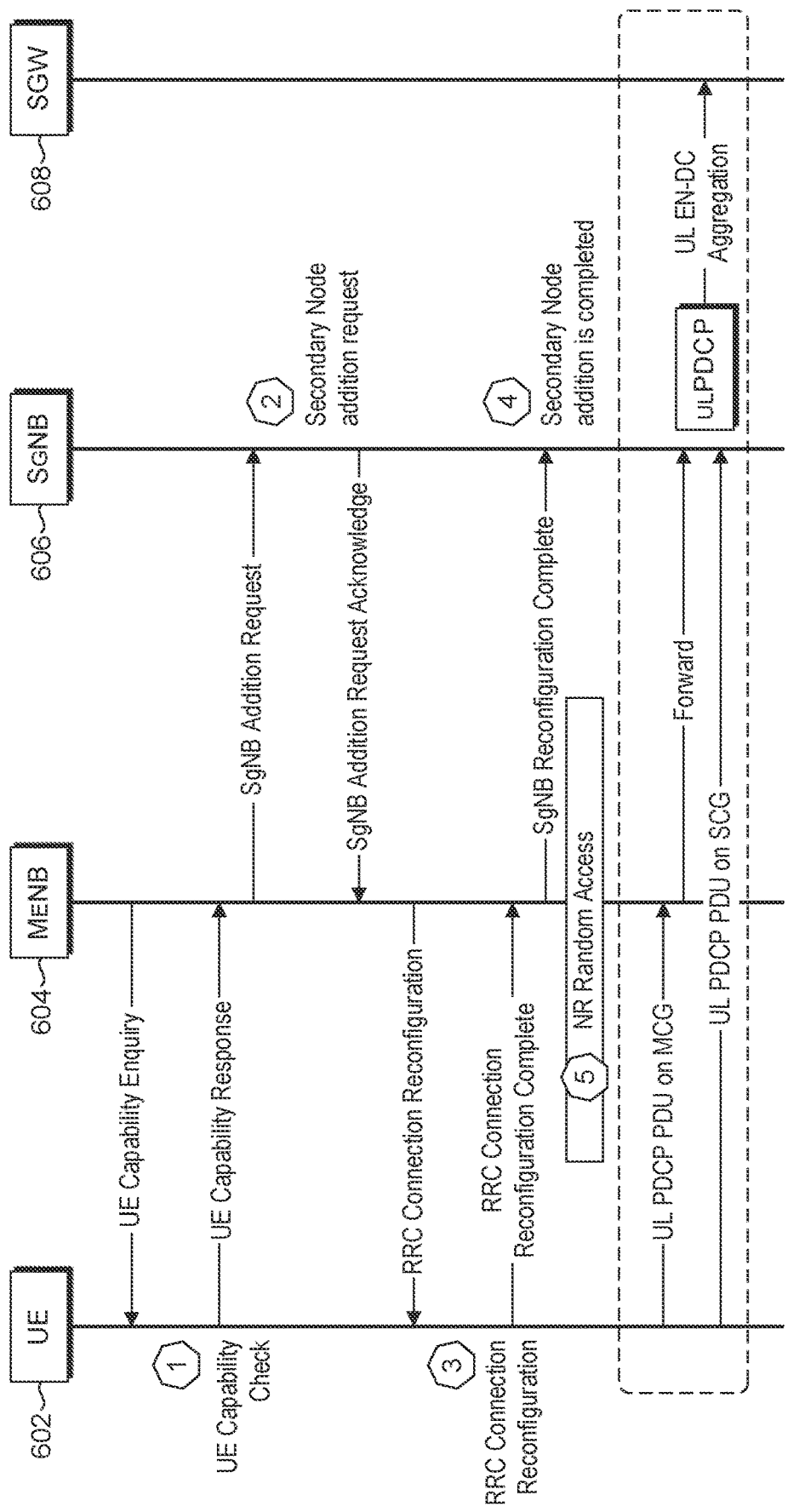
FIG. 6 depicts a call flow for adding an SgNB after handover from an SA network, in accordance with aspects herein.

FIG. 6 depicts a call flow for adding a SgNB after handover from an SA network, in accordance with aspects herein. The call flow 600 is performed between a UE 602, a MeNB 604, a SgNB 606, and a signaling gateway (SGW) 608. In step 1 the UE 602 provides a capability response to the MeNB 604. The capability response may include buffer requirements, data throughput, and similar information. Based on the capability response from UE 602 a SgNB addition request may be sent in step 2. The SgNB 606 sends a SgNB addition request acknowledgement to the MeNB 604, which then sends an RRC connection reconfiguration message to UE 602 as the initiation of step 3. The UE begins the RRC connection reconfiguration in step 3 and when complete, sends an RRC connection reconfiguration complete message to the MeNB 604. The MeNB 604 sends a SgNB reconfiguration complete message to the SgNB 606 in step 4.

In step 5 the random access process begins with the UE 602 sending an UL PDCP PDI on the mobile communication gateway (MCG) to the MeNB 604 which forwards the message to the SgNB 606. At this stage UL E-Utran New Radio-Dual Connectivity (EN-DC) aggregation is complete. The UE 602 then sends an UL PDCP PDU on the service control gateway (SCG) to the SgNB 608. The SgNB 606 then operates in UL PDCP.

Figure 7:
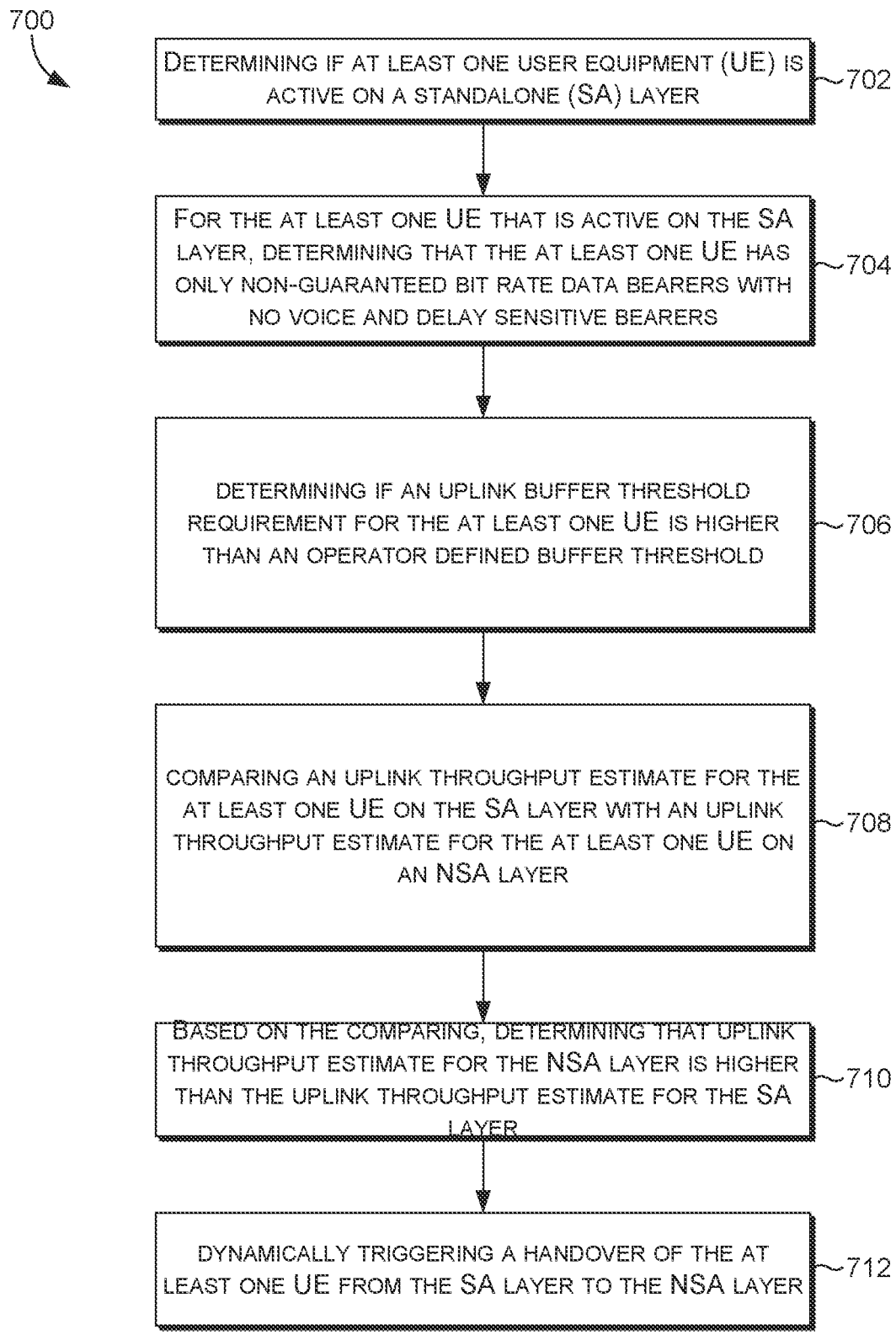
FIG. 7 is a flow diagram of an exemplary method for dynamic steering across NSA and SA network architectures based on uplink throughput requirements, in which aspects of the present disclosure may be employed, in accordance with aspects herein.

FIG. 7 is a flow diagram of an exemplary method for dynamic steering across NSA and SA network architectures based on uplink throughput requirements, in which aspects of the present disclosure may be employed, in accordance with aspects herein. The method 700 begins in 702 with determining if at least one UE is active on an SA layer. Then in 704, if at least one UE is active on the SA layer, it is then determined if the at least one UE has only non-guaranteed bit rate data bearers with no voice and delay sensitive bearers. In step 706, an uplink buffer threshold requirement for the UE is determined. An uplink buffer threshold may only be determined if the UE has only non-guaranteed bit rate data bearers with no voice and delay sensitive bearers. Next, in step 708, an uplink throughput estimate for the at least one UE on the SA layer is compared with an uplink throughput estimate on the NSA layer. This comparison is made if the uplink buffer threshold requirement for the at least one UE is higher than an operator defined buffer threshold.

Next, in step 710 a determination is made whether the NSA layer uplink throughput is higher than the SA layer uplink throughput. In step 712, the method concludes with dynamically triggering a handover of the at least one UE from the SA layer to the NSA layer is made if the NSA layer uplink throughput is higher than the SA layer uplink throughput.

The UE may connect to the SA layer through a NR base station and may connect to the NSA layer through a NR base station and an LTE base station. During NSA operation the LTE base station serves as a master base station, or MeNB and the NR base station serves as an SgNB secondary base station. The NSA and SA layers may be co-located or non-co-located. Network load balancing may determine that dynamically handing over the SA layer operation of the at least one UE would negatively affect network load balancing, If network load balancing would be adversely affected, the handover may not be made.

FIG. 8 depicts an exemplary computing device suitable for use in implementations of the present disclosure, in accordance with aspects herein. With continued reference to FIG. 8, computing device 800 includes bus 810 that directly or indirectly couples the following devices: memory 812, one or more processors 814, one or more presentation components 816, input/output (I/O) ports 818, I/O components 820, radio 824, and power supply 822. Bus 810 represents what may be one or more busses (such as an address bus, data bus, or combination thereof). Although the devices of FIG. 8 are shown with lines for the sake of clarity, in reality, delineating various components is not so clear, and metaphorically, the lines would more accurately be grey and fuzzy. For example, one may consider a presentation component such as a display device to be one of I/O components 820. Also, processors, such as one or more processors 814, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. Memory 812 may be removable, nonremovable, or a combination thereof. Exemplary memory includes solid-state memory, hard drives, optical-disc drives, etc. Computing device 800 includes one or more processors 814 that read data from various entities such as bus 810, memory 812 or I/O components 818. One or more presentation components 816 present data indications to a person or other device. Exemplary one or more presentation components 816 include a display device, speaker, printing component, vibrating component, etc. I/O ports 818 allow computing device 800 to be logically coupled to other devices including I/O components 820, some of which may be built into computing device 800. Illustrative I/O components 820 include a microphone, joystick, game pad, satellite dish, scanner, printer, wireless device, etc.

The radio 824 represents one or more radios that facilitate communication with a wireless telecommunications network. While a single radio 824 is shown in FIG. 8, it is contemplated that there may be more than one radio 824 coupled to the bus 810. It is expressly conceived that a computing device with more than one radio 824 could facilitate communication with the wireless telecommunications network via both the first radio and a second radio. Illustrative wireless telecommunications technologies include CDMA, GPRS, TDMA, GSM, and the like. The radio 824 may additionally or alternatively facilitate other types of wireless communications including Wi-Fi, WiMAX, LTE, 3G, 4G, LTE, 5G, 6G, NR, VOLTE, or other VoIP communications. As can be appreciated, in various embodiments, radio 824 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of dynamic steering across non-standalone (NSA) network segments and standalone (SA) layers in a network, the method comprising:
    determining if at least one user equipment (UE) is active on a SA layer;
    based on the determining that at least one UE is active on the SA layer, determining if the at least one UE has only non-guaranteed bit rate data bearers with no voice and delay sensitive bearers;
    based on the determining that the at least one UE has only non-guaranteed bit rate data bearers with no voice and delay sensitive bearers, determining if an uplink buffer threshold requirement for the at least one UE is higher than an operator defined buffer threshold;
    based on the determining that the uplink buffer threshold requirement for the at least one UE is higher than the operator defined buffer threshold, comparing an uplink throughput estimate for the at least one UE on the SA layer with an uplink throughput estimate for the at least one UE on a NSA layer;
    based on the comparing, determining if the NSA layer uplink throughput is higher than the SA layer uplink throughput; and
    based on the determining that the NSA layer uplink throughput is higher than the SA layer uplink throughput, dynamically triggering a handover of the at least one UE from the SA layer to the NSA layer.

2. The method of claim 1, wherein the at least one UE connects to the SA layer through a new radio (NR) base station.

3. The method of claim 1, wherein the at least one UE connects to the NSA layer through a new radio (NR) base station and a long-term evolution (LTE) base station.

4. The method of claim 3, wherein the LTE base station serves as a master base station.

5. The method of claim 4, wherein the NR base station serves as a secondary base station.

6. The method of claim 1, wherein the comparison of uplink buffer throughput estimates is based on co-located SA and NSA layers.

7. The method of claim 1, wherein the comparison of uplink buffer throughput estimates is based on non-co-located SA and NSA layers.

8. The method of claim 1, wherein the handover is further based on whether the handover would overload one radio access technology.

9. A non-transitory computer storage media storing computer-useable instructions that, when used by one or more processors, cause the processors to:
    determine if at least one user equipment (UE) is active on a SA layer;
    based on the determination that at least one UE is active on the SA layer, determine if the at least one UE has only non-guaranteed bit rate data bearers with no voice and delay sensitive bearers;
    based on the determination that the at least one UE has only non-guaranteed bit rate data bearers with no voice and delay sensitive bearers, determine if an uplink buffer threshold requirement for the at least one UE is higher than an operator defined buffer threshold;
    based on the determination that the uplink buffer threshold requirement for the at least one UE is higher than the operator defined buffer threshold, compare an uplink throughput estimate for the at least one UE on the SA layer with an uplink throughput estimate for the at least one UE on a NSA layer;
    based on the comparison, determine that the NSA layer uplink throughput is higher than the SA layer uplink throughput; and
    based on the determination that the NSA layer uplink throughput is higher than the SA layer uplink throughput, dynamically trigger a handover of the at least one UE from the SA layer to the NSA layer.

10. The non-transitory computer storage media of claim 9, wherein the at least one UE connects to the SA layer through a new radio (NR) base station.

11. The non-transitory computer storage media of claim 9, wherein the at least one UE connects to the NSA layer through a new radio (NR) base station and a long-term evolution (LTE) base station.

12. The non-transitory computer storage media of claim 11, wherein the LTE base station serves as a master base station.

13. The non-transitory computer storage media of claim 12, wherein the NR base station serves as a secondary base station.

14. The non-transitory computer storage media of claim 9, wherein the handover is further based on whether the handover would overload one radio access technology.

* * * * *